(12) United States Patent
Ovadia et al.

(10) Patent No.: US 9,491,957 B2
(45) Date of Patent: Nov. 15, 2016

(54) METHOD OF MAKING A COOKED FOOD PRODUCT HAVING A FRIED APPEARANCE

(75) Inventors: David Z. Ovadia, Marshall, MN (US);
Kathleen A. Hunkins, San Leon, TX (US); Cecelia K. Tham, Sugar Land, TX (US)

(73) Assignee: SFC Global Supply Chain, Inc., Marshall, MN (US)

( * ) Notice: Subject to any disclaimer, the term of this patent is extended or adjusted under 35 U.S.C. 154(b) by 1176 days.

(21) Appl. No.: 12/613,651

(22) Filed: Nov. 6, 2009

(65) Prior Publication Data

US 2010/0119659 A1     May 13, 2010

Related U.S. Application Data

(60) Provisional application No. 61/112,827, filed on Nov. 10, 2008.

(51) Int. Cl.
| | |
|---|---|
| *A23L 1/025* | (2006.01) |
| *A23L 1/01* | (2006.01) |
| *A23L 1/212* | (2006.01) |
| *A23L 1/31* | (2006.01) |
| *A23L 1/315* | (2006.01) |
| *A23L 1/317* | (2006.01) |
| *A23L 1/322* | (2006.01) |

(52) U.S. Cl.
CPC ............ *A23L 1/0128* (2013.01); *A23L 1/0135* (2013.01); *A23L 1/2125* (2013.01); *A23L 1/3103* (2013.01); *A23L 1/3157* (2013.01); *A23L 1/3172* (2013.01); *A23L 1/322* (2013.01)

(58) Field of Classification Search
CPC ............................ A23L 1/0128; A23L 1/0135
See application file for complete search history.

(56) References Cited

U.S. PATENT DOCUMENTS

| | | | |
|---|---|---|---|
| 4,289,792 A | 9/1981 | Smith | |
| 4,409,453 A | 10/1983 | Smith | |
| 4,427,706 A | 1/1984 | El-Hag | |
| 4,492,839 A | 1/1985 | Smith | |

(Continued)

FOREIGN PATENT DOCUMENTS

| | | |
|---|---|---|
| WO | WO 98/23161 | 6/1998 |
| WO | WO 98/53712 | 12/1998 |

(Continued)

OTHER PUBLICATIONS

"What is Deep-Frying?". Retrieved online from iEmily.com, available online Oct. 25, 2006. p. 1.*

(Continued)

*Primary Examiner* — Jenna A Watts
(74) *Attorney, Agent, or Firm* — Dicke, Billig & Czaja, PLLC

(57) ABSTRACT

A method of making a cooked food product having a fried appearance comprises assembling a food product having a weight of approximately 1 to 4 ounces (28.3 to 113.4 grams). The food product is heated with microwave energy at a frequency of approximately 800 to 3000 MHz, at a power of approximately 0 to 50 Watts per ounce (28.3 grams) of product, and for approximately 0 to 80 seconds. The food product is coated with a coating layer to form a coated food product. The coated food product is heated in an impingement oven at a temperature of approximately 400 to 600° F. (200 to 325° C.) for less than approximately 140 seconds to form the cooked food product with a fried appearance.

33 Claims, 14 Drawing Sheets

(56) References Cited

U.S. PATENT DOCUMENTS

| | | | |
|---|---|---|---|
| 5,106,635 A | | 4/1992 | McCutchan et al. |
| 5,266,345 A | * | 11/1993 | Corbin et al. ............. 426/555 |
| 5,272,299 A | | 12/1993 | Ovadia |
| 5,334,402 A | | 8/1994 | Ovadia |
| 5,520,099 A | | 5/1996 | Chung |
| 5,539,187 A | | 7/1996 | Smith et al. |
| 5,580,595 A | | 12/1996 | Bows et al. |
| 5,747,086 A | | 5/1998 | Bows et al. |
| 5,771,786 A | | 6/1998 | Chung |
| 5,858,431 A | | 1/1999 | Wiedersatz |
| 5,942,142 A | | 8/1999 | Forney et al. |
| 5,945,021 A | | 8/1999 | Chung |
| 5,958,274 A | | 9/1999 | Dobie et al. |
| 5,965,186 A | * | 10/1999 | Hayes-Jacobson et al. .. 426/512 |
| 5,997,925 A | | 12/1999 | Wilson et al. |
| 6,011,249 A | | 1/2000 | Chung |
| 6,045,841 A | | 4/2000 | Singh et al. |
| 6,104,014 A | | 8/2000 | Chung |
| 6,228,405 B1 | | 5/2001 | Walsh et al. |
| 6,320,165 B1 | | 11/2001 | Ovadia |
| RE37,706 E | | 5/2002 | Chung |
| 6,396,031 B1 | | 5/2002 | Forrester |
| 7,092,988 B1 | | 8/2006 | Bogatin et al. |
| 7,307,243 B2 | | 12/2007 | Farkas et al. |
| 2003/0089243 A1 | | 5/2003 | Chung |
| 2004/0060456 A1 | | 4/2004 | Chung |
| 2004/0156954 A1 | * | 8/2004 | Maheshwari et al. .......... 426/97 |
| 2004/0250688 A1 | | 12/2004 | Farkas et al. |
| 2007/0254077 A1 | * | 11/2007 | Germano et al. ............. 426/516 |
| 2008/0026118 A1 | | 1/2008 | Bows et al. |
| 2008/0026122 A1 | | 1/2008 | Bows et al. |
| 2008/0127833 A1 | | 6/2008 | Lee |
| 2008/0138480 A1 | | 6/2008 | Bows et al. |
| 2008/0164178 A1 | | 7/2008 | Wnek et al. |

FOREIGN PATENT DOCUMENTS

| | | |
|---|---|---|
| WO | WO 99/44428 | 9/1999 |
| WO | WO 2004/100667 A2 | 11/2004 |

OTHER PUBLICATIONS

Robinson, et al. Ed. Encyclopedia of Food Microbiology. 2000. Academic Press. "Action of Microwaves". A Stolle et al. 1999. Academic Press. pp. 1036-1040.*

"Is it done yet?". USDA Food Safety and Inspection Service. Available on fsis.usda.gov on May 6, 2006. pp. 1-3.*

Chapter 10—Dietary Guidelines for Americans 2005. Available online as of Apr. 21, 2005 from www.health.gov/dietaryguidelines/dga2005/document/html/ch. pp. 1-3.*

"Unique Advantages of Microwave Heat Processing". Available online as of Dec. 5, 2005 from www.microdry.com. pp. 1-2.*

Moreira, Rosana G. et al. Deep-Fat Frying. Gaithersburg, Maryland, Aspen Publishers, 1999. Part 1 of 2.

Moreira, Rosana G. et al. Deep-Fat Frying. Gaithersburg, Maryland, Aspen Publishers, 1999. Part 2 of 2.

Sumnu, G. et al. "Baking using microwave processing." In: Schubert H. et al. The Microwave Processing of Foods (Cambridge England, Woodhead Publishing Limited, 2005), Chapter 7, pp. 119-141.

Geedipalli, S.S.R. et al., "Modeling the heating uniformity contributed by a rotating turntable in microwave ovens", Journal of Food Engineering, vol. 82 (2007), pp. 359-368.

Global Protein Products, Inc. "ICEIN™ Food Processing Aid," 2007. [online] [retrieved Oct. 9, 2008] <http://www.globalprotein.com/icein.html>.

International Search Report for PCT/US2009/063668 mailed Jan. 29, 2010.

Lee, D.H. et al., "Turbulent flow and heat transfer measurements on a curved surface with a fully developed round impinging jet", Int. Journal Heat and Fluid Flow, vol. 18, (1997), pp. 160-169.

Main, Douglas M. "I can't believe it's not fried: New oven fries food without oil," Purdue University News. Sep. 16, 2008 [online] [retrieved on Sep. 29, 2008] <http://www.purdue.edu/uns/x/2008b/080916KeenerRadfryer.html>.

Ovadia, David Z. et al. "Impingement in Food Processing," FoodTechnology, vol. 52, No. 4 (Apr. 1998), pp. 46-50.

Ovadia, David Z. et al. "Opportunities for Impingement Technology in the Baking and Allied Industries (Part IV)," American Institute of Baking Research Department Technical Bulletin, vol. XIX, Issue 5 (May 1997), pp. 1-7.

Penford Food Ingredients. Technical Data, "PenPlus® WR", last revision date Feb. 13, 2006.

Red Arrow Products Company LLC. "Browning Products," 2007. [online] [retrieved on Oct. 9, 2008] <http://www.redarrowusa.com/redarrow.html>.

Walker, C.E. et al., Impingement Oven Technology—Part III Combining Impingement With Microwave (Hybrid Oven), American Institute of Baking Research Department Technical Bulletin, vol. XV, Issue 9 (Sep. 1993) pp. 1-6.

* cited by examiner

FIG. 2A

Vegetable Egg Rolls
Low Fat Filling
3 ounces

Current Fried Product
3 grams oil pick-up

Nutrition Facts

Serving Size 1 egg roll (85g)
Servings Per Container 12

Amount Per Serving

| Calories 140 | Calories from Fat 35 |
|---|---|
| | % Daily Value* |
| Total Fat 4g | 6% |
|    Saturated Fat 1g | 5% |
|    Trans Fat 0g | |
| Cholesterol 5mg | 2% |
| Sodium 530mg | 22% |
| Total Carbohydrate 22g | 7% |
|    Dietary Fiber 2g | 8% |
|    Sugars 2g | |
| Protein 4g | |

Vitamin A 15% • Vitamin C 8%

Calcium 2% • Iron 8%

*Percent Daily Values are based on a 2,000 calorie diet. Your daily values may be higher or lower depending on your calorie needs:

| | Calories: | 2,000 | 2,500 |
|---|---|---|---|
| Total Fat | Less than | 65g | 80g |
|   Saturated Fat | Less than | 20g | 25g |
| Cholesterol | Less than | 300mg | 300 mg |
| Sodium | Less than | 2,400mg | 2,400mg |
| Total Carbohydrate | | 300g | 375g |
|   Dietary Fiber | | 25g | 30g |

Calories per gram:
    Fat 9 • Carbohydrate 4 • Protein 4

FIG. 2B
Vegetable Egg Rolls
Low Fat Filling
3 ounces
Dough + Dip Product
1 gram
50% less fat

| Nutrition Facts |  |
|---|---|
| Serving Size 1 egg roll (85g) | |
| Servings Per Container 12 | |
| Amount Per Serving | |
| Calories 120 | Calories from Fat 15 |
|  | % Daily Value* |
| Total Fat 2g | 3% |
|    Saturated Fat 0g | 0% |
|    Trans Fat 0g | |
| Cholesterol 5mg | 2% |
| Sodium 540mg | 23% |
| Total Carbohydrate 22g | 7% |
|    Dietary Fiber 2g | 8% |
|    Sugars 2g | |
| Protein 4g | |
| Vitamin A 15% • Vitamin C 8% | |
| Calcium 2% • Iron 8% | |

*Percent Daily Values are based on a 2,000 calorie diet. Your daily values may be higher or lower depending on your calorie needs:

|  |  | Calories: | 2,000 | 2,500 |
|---|---|---|---|---|
| Total Fat | | Less than | 65g | 80g |
|   Saturated Fat | | Less than | 20g | 25g. |
| Cholesterol | | Less than | 300mg | 300 mg |
| Sodium | | Less than | 2,400mg | 2,400mg |
| Total Carbohydrate | | | 300g | 375g |
|   Dietary Fiber | | | 25g | 30g |

Calories per gram:
    Fat 9 • Carbohydrate 4 • Protein 4

FIG. 2C

Vegetable Egg Rolls
Low Fat Filling
3 ounces
No Oil
75% less fat

Nutrition Facts

Serving Size 1 egg roll (85g)
Servings Per Container 12

Amount Per Serving

| Calories 110 | Calories from Fat 10 |
|---|---|

| | % Daily Value* |
|---|---|
| Total Fat 1g | 2% |
| Saturated Fat 0g | 0% |
| Trans Fat 0g | |
| Cholesterol 5mg | 2% |
| Sodium 550mg | 23% |
| Total Carbohydrate 23g | 8% |
| Dietary Fiber 2g | 8% |
| Sugars 2g | |
| Protein 4g | |

| Vitamin A 15% | • | Vitamin C 8% |
|---|---|---|
| Calcium 2% | • | Iron 8% |

*Percent Daily Values are based on a 2,000 calorie diet. Your daily values may be higher or lower depending on your calorie needs:

| | | Calories: | 2,000 | 2,500 |
|---|---|---|---|---|
| Total Fat | | Less than | 65g | 80g |
| Saturated Fat | | Less than | 20g | 25g |
| Cholesterol | | Less than | 300mg | 300 mg |
| Sodium | | Less than | 2,400mg | 2,400mg |
| Total Carbohydrate | | | 300g | 375g |
| Dietary Fiber | | | 25g | 30g |

Calories per gram:
    Fat 9  •  Carbohydrate 4  •  Protein 4

FIG. 3A

Pork and Shrimp Egg Rolls

High Fat Filling 3 ounces

Current Fried Product 3 grams oil pick-up

Nutrition Facts

Serving Size 1 egg roll (85g)
Servings Per Container 12

Amount Per Serving

| Calories 170 | Calories from Fat 70 |
|---|---|
| | % Daily Value* |
| Total Fat 8g | 13% |
|    Saturated Fat 2.5g | 13% |
|    Trans Fat 0g | |
| Cholesterol 25mg | 8% |
| Sodium 540mg | 22% |
| Total Carbohydrate 19g | 6% |
|    Dietary Fiber 2g | 6% |
|    Sugars 2g | |
| Protein 6g | |

| Vitamin A 10% | • Vitamin C 6% |
|---|---|
| Calcium 4% | • Iron 10% |

*Percent Daily Values are based on a 2,000 calorie diet. Your daily values may be higher or lower depending on your calorie needs:

| | Calories: | 2,000 | 2,500 |
|---|---|---|---|
| Total Fat | Less than | 65g | 80g |
|   Saturated Fat | Less than | 20g | 25g |
| Cholesterol | Less than | 300mg | 300 mg |
| Sodium | Less than | 2,400mg | 2,400mg |
| Total Carbohydrate | | 300g | 375g |
|   Dietary Fiber | | 25g | 30g |

Calories per gram:
    Fat 9 • Carbohydrate 4 • Protein 4

FIG. 3B

Pork and Shrimp Egg Rolls
High Fat Filling
3 ounces

Dough + Dip Product
1 gram

22% less fat

Nutrition Facts

Serving Size 1 egg roll (85g)
Servings Per Container 12

Amount Per Serving

| Calories 160 | Calories from Fat 60 |
|---|---|
| | % Daily Value* |
| Total Fat 7g | 10% |
|    Saturated Fat 2g | 11% |
|    Trans Fat 0g | |
| Cholesterol 25mg | 8% |
| Sodium 550mg | 23% |
| Total Carbohydrate 19g | 6% |
|    Dietary Fiber 2g | 6% |
|    Sugars 2g | |
| Protein 7g | |

| Vitamin A 10% | • | Vitamin C 6% |
|---|---|---|
| Calcium 4% | • | Iron 10% |

*Percent Daily Values are based on a 2,000 calorie diet. Your daily values may be higher or lower depending on your calorie needs:

| | Calories: | 2,000 | 2,500 |
|---|---|---|---|
| Total Fat | Less than | 65g | 80g |
|   Saturated Fat | Less than | 20g | 25g |
| Cholesterol | Less than | 300mg | 300 mg |
| Sodium | Less than | 2,400mg | 2,400mg |
| Total Carbohydrate | | 300g | 375g |
|   Dietary Fiber | | 25g | 30g |

Calories per gram:
      Fat 9 • Carbohydrate 4 • Protein 4

FIG. 3C

Pork and Shrimp Egg Rolls
High Fat Filling
3 ounces
No Oil
35% less fat

Nutrition Facts

Serving Size 1 egg roll (85g)
Servings Per Container 12

Amount Per Serving

| Calories 150 | Calories from Fat 50 |
|---|---|

| | % Daily Value* |
|---|---|
| Total Fat 6g | 9% |
| Saturated Fat 2g | 9% |
| Trans Fat 0g | |
| Cholesterol 25mg | 8% |
| Sodium 550mg | 23% |
| Total Carbohydrate 20g | 7% |
| Dietary Fiber 2g | 6% |
| Sugars 2g | |
| Protein 7g | |

| Vitamin A 10% | • | Vitamin C 6% |
|---|---|---|
| Calcium 4% | • | Iron 10% |

*Percent Daily Values are based on a 2,000 calorie diet. Your daily values may be higher or lower depending on your calorie needs:

| | Calories: | 2,000 | 2,500 |
|---|---|---|---|
| Total Fat | Less than | 65g | 80g |
| Saturated Fat | Less than | 20g | 25g |
| Cholesterol | Less than | 300mg | 300 mg |
| Sodium | Less than | 2,400mg | 2,400mg |
| Total Carbohydrate | | 300g | 375g |
| Dietary Fiber | | 25g | 30g |

Calories per gram:
    Fat 9 • Carbohydrate 4 • Protein 4

METHOD OF MAKING A COOKED FOOD PRODUCT HAVING A FRIED APPEARANCE

This application claims priority to U.S. Provisional Application Ser. No. 61/112,827, filed Nov. 10, 2008 and entitled "Cooked Food Having a Fried Appearance and Method of Making Same."

FIELD OF THE INVENTION

The present invention relates to a cooked food having a fried appearance and a method of making same.

BACKGROUND OF THE INVENTION

Fried foods are very appealing to many consumers, and the appeal stems from the flavors, aromas, textures, and colors created by the product formulation and the frying process. Although appealing, the potential health hazards related to fried foods have caused concern among many consumers.

The present invention addresses the problems associated with prior art foods and methods of preparing the foods and provides for a method of making a cooked food having a fried appearance.

SUMMARY OF THE INVENTION

One aspect of the present invention provides a method of making a cooked food product having a fried appearance. A food product having a weight of approximately 1 to 4 ounces (28.3 to 113.4 grams) is assembled. The food product is heated with microwave energy at a frequency of approximately 800 to 3000 MHz, at a power of approximately 0 to 50 Watts per ounce (28.3 grams) of product, and for approximately 0 to 80 seconds. The food product is coated with a coating layer to form a coated food product. The coated food product is heated in an impingement oven at a temperature of approximately 400 to 600° F. (200 to 325° C.) for less than approximately 140 seconds to form the cooked food product with a fried appearance.

Another aspect of the present invention provides a cooked food product having a fried appearance comprising an edible core, an edible cover layer, and a coating layer. The edible cover layer substantially envelopes the edible core to form a food product. The edible cover layer comprises a farinaceous composition comprising approximately 20 to 50 weight % of the food product and a first lipid comprises approximately 0.7 to 2.5 weight % of the edible cover layer. A second lipid is obtained from the coating layer contacted with the edible cover layer after the food product is assembled but before final heating of the food product.

Another aspect of the present invention provides a method of obtaining a cooked food product with a fried appearance characterized by an at least partially browned exterior having small blisters arising from heating. A food product with an edible core and an edible cover layer is assembled. The food product weighs approximately 1 to 4 ounces (28.3 to 113.4 grams). The edible cover layer comprises approximately 0.7 to 2.5 weight % of a first lipid based on the weight of the edible cover layer. The food product is heated with microwave energy at a frequency of approximately 800 to 3000 MHz, at a power of approximately 0 to 50 Watts per ounce (28.3 grams) of food product, and for approximately 0 to 80 seconds. The food product is coated with a coating layer comprising a second lipid, such that the coating layer applied to the food product comprises approximately 0.2 to 2.0 weight % of the food product, to form a coated food product. The coated food product is heated in an impingement oven at a temperature of approximately 400 to 600° F. (200 to 325° C.) for less than approximately 140 seconds to form the cooked food product with a fried appearance.

Another aspect of the present invention provides a coating for a food. The coating has a weight and comprises an aqueous composition comprising a dispersed phase. The dispersed phase comprises approximately 0.0 to 60.0 weight % based on the weight of the coating of an edible oil, approximately 0.0 to 0.6 weight % based on the weight of the coating of an emulsifying agent, approximately 1.0 to 7.0 weight % based on the weight of the aqueous composition of a starch, and approximately 4.0 to 12.0 weight % based on the weight of the aqueous composition of a browning agent.

BRIEF DESCRIPTION OF THE DRAWINGS

FIG. 2A shows product labels for vegetable egg rolls heated using a first process;

FIG. 2B shows product labels for vegetable egg rolls heated using a second process;

FIG. 2C shows product labels for vegetable egg rolls heated using a third process;

FIG. 3A shows product labels for pork and shrimp egg rolls heated using a first process;

FIG. 3B shows product labels for pork and shrimp egg rolls heated using a second process;

FIG. 3C shows product labels for pork and shrimp egg rolls heated using a third;

DETAILED DESCRIPTION OF A PREFERRED EMBODIMENT

Figure 1:
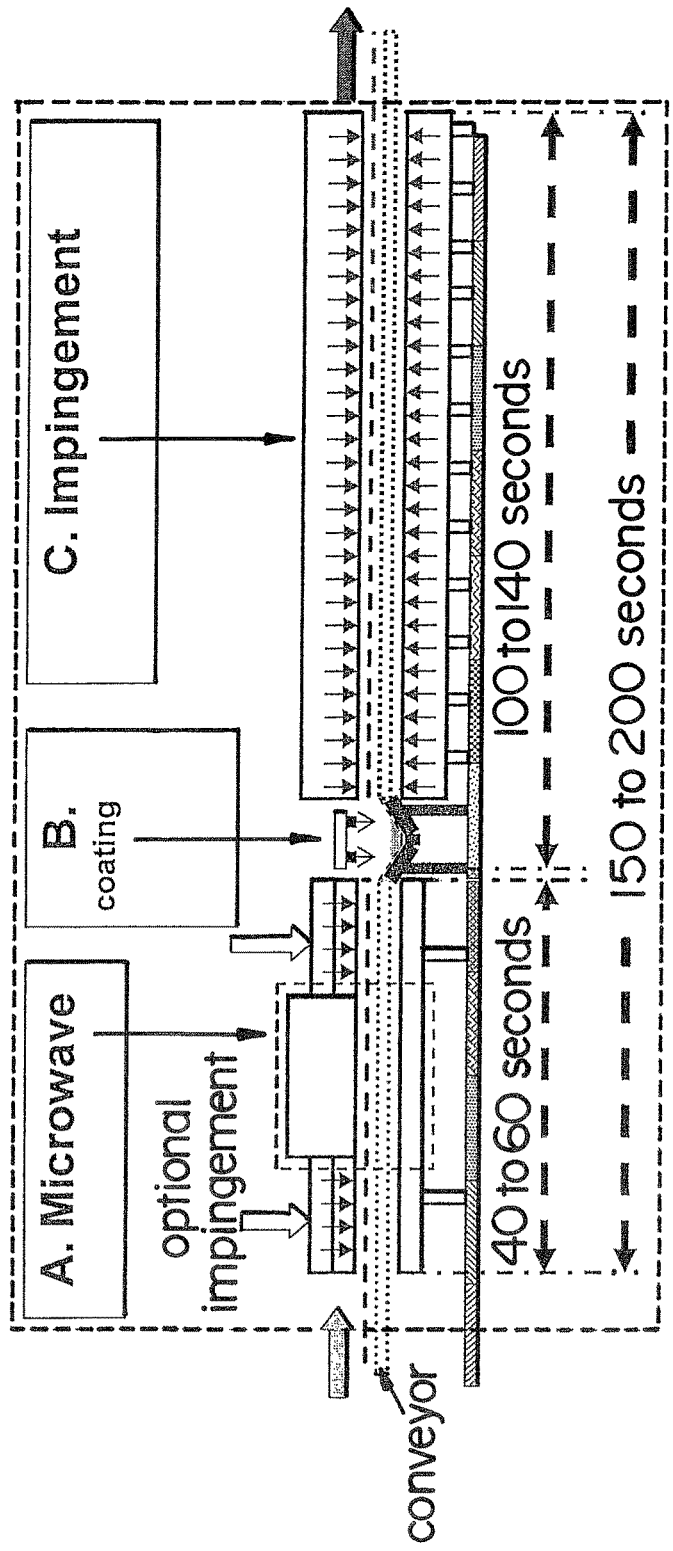
FIG. 1 is a schematic view illustrating a preferred embodiment method of making a cooked food having a fried appearance in accordance with the principles of the present invention.

One preferred embodiment method of making a cooked food having a fried appearance in accordance with the principles of the present invention is shown in FIG. 1. Although one of the cooked foods is an egg roll in the following description, it is recognized that the present invention could be used with any suitable cooked food product such as, but not limited to, a burrito, a chimichanga, a flauta, a pot sticker, a puff, a breaded meat, a breaded fish, a breaded vegetable, a breaded dairy product, a battered meat, a battered fish, a battered vegetable, and a battered dairy product.

The terms heat, heated, heating and cook, cooked, cooking could be used interchangeably and are intended to mean at least partially heated or cooked. Therefore, a heated food or a cooked food is a food that is at least partially heated or cooked. Depending upon the type of food product, the food product may or may not have to be heated to at least approximately 165° F. for food safety reasons. For example, if the food product includes fruits or vegetables and does not include any meats, the food product may not need to be heated to at least approximately 165° F. and a lower temperature could be acceptable.

The food product includes an edible core, alternatively referred to as a filling, and an edible cover layer substantially enveloping the edible core. The edible core could be a savory core, a sweet core, a combined savory and sweet core, or any other suitable edible core. The edible core could be either raw or at least partially cooked prior to heating in accordance with the present invention. Further, the edible core could have a fat content of approximately 0%.

The edible cover layer preferably comprises a farinaceous composition containing a first lipid and comprising approximately 20 to 50 weight % based on the weight of the food product. The first lipid could be a room temperature solid fat or a room temperature semi-solid fat. The first lipid is preferably a shortening. An example of a shortening that could be used is All Purpose Shortening manufactured by Ventura Foods, LLC. Other lipids that could be used are liquids at room temperature such as soy, cottonseed, or canola oil. The edible cover layer could also comprise approximately 0.00 to 0.20 weight % annatto, which assists in providing coloration resembling that of a fried product that is typically reduced or absent when baked.

The dough used to form the edible cover layer preferably has a higher fat content than if the food product were going to be fried. For example, if the fat content of the edible cover layer dough typically ranges from approximately 0.1 to 0.8 weight %, then the fat content is preferably increased to a range of approximately 0.7 to 2.5 weight % based on the weight of the edible cover layer.

The edible cover layer dough could also be "docked" by adding bread crumbs, adding corn grit, using a mechanical device such as pins to exert pressure onto or puncture the dough, or any other suitable docking agent. Within the context of this invention, being "docked" means the reduced formation of surface blisters larger than approximately 10 millimeters in diameter and minimization of that diameter. Preferably, if a material such as bread crumbs or corn grit is used, the dough includes approximately 1 to 5%, more preferably approximately 3%, by weight of the dough of the docking agent. Alternatively, the docking agent could be coated with approximately 15 to 30% vegetable oil before inclusion into the dough as one of its ingredients and the amount of fat otherwise added directly into the dough could be reduced.

After the food product is assembled, the food product is preferably transported through the heating process on a mesh conveyor. The conveyor is preferably a non-metallic mesh conveyor, more preferably a plastic mesh conveyor, in a microwave oven, and the conveyor is preferably a metal conveyor in an impingement oven. First, the food product is heated using microwave energy. Preferably, a frequency of approximately 800 to 3000 MHz, a power of approximately 0 to 50 Watts per ounce (28.3 grams) of food product, and a time of approximately 0 to 80 seconds are used to increase the temperature of the food product, preferably by approximately 100° F., for food products weighing approximately 1 to 4 ounces (28.3 to 113.4 grams).

The temperature within the microwave oven is preferably approximately 120 to 200° F., and the internal temperature of the food product after the microwave heating step is preferably approximately 120 to 180° F. (49 to 82° C.). The microwave heating step could also include impingement heating at one or both ends of the microwave oven. Smaller products such as an approximately one ounce (28.3 grams) crab Rangoon could be prepared in similar process times but with reduced levels of microwave heating or no microwave heating at all because conventional heat transfer into the center of such smaller products is much faster.

Food products such as but not limited to egg rolls act somewhat like tungsten light bulbs through which an electric current flows; the current generates heat, which is a desired end result for egg rolls. For an egg roll, the edible cover layer preferably includes a flap, which is preferably placed down during microwave heating. Placing the flap down during the microwave heating step helps seal the seam to prevent the seam from opening during further processing.

An example of products heated by this procedure is cylindrical egg rolls weighing approximately 1 to 4 ounces (28.3 to 113.4 grams) and having dimensions of approximately 60 to 160 mm in length and approximately 20 to 40 mm in diameter. Spherical products could also be heated by this procedure but it is recognized that spherical products having the same weight as cylindrical products would likely need to be heated longer than cylindrical products to sufficiently heat the centers of the products. Products of less regular shapes such as half-moon shaped pot stickers each weighing approximately 2 ounces (56.7 grams) or a crab Rangoons each weighing approximately one ounce (28.3 grams) could also be prepared by this procedure at reduced processing times compared to frying.

After the food product has been heated using microwave energy, the food product is then coated or covered with a coating layer. The coating layer could be a relatively thick, viscous coating to ensure adequate coverage that does not run off of the food product too quickly. Alternatively, the coating layer could be at least semi-solid, liquefying when exposed to heat, wrapped about the food product. The coating is preferably applied between microwave heating and impingement oven heating or, alternatively, prior to a combined microwave and impingement oven heating.

The coating could be accomplished by dipping the food product in a bath of coating, spraying the coating onto the food product, rolling the food product through the coating, or any other suitable means of coating the food product. The coating is preferably paste-like to adhere to the food product. Preferably, the coating is a suspension of oil in an aqueous phase of a starch or a gum paste solution, or an emulsion similar to the suspension but with an emulsifier making it more stable. The coating layer could be an aqueous oil emulsion comprising approximately 40 to 100 weight % of an aqueous phase and approximately 0 to 60 weight % of an oil phase. Alternatively, the coating layer could comprise an aqueous starch solution without oil or an emulsifier. It is recognized that the coating could be modified depending upon the food product and the desired fried appearance. An example of a suitable coating is shown in Table 1, and an example of a suitable aqueous starch solution is shown in Table 2.

TABLE 1

| Coating | |
|---|---|
| Ingredients | Weight % of Coating |
| oil | 0 to 60 |
| aqueous starch solution | 40 to 100 |
| emulsifier | 0 to 0.60 |

TABLE 2

Aqueous Starch Solution

| Ingredients | Weight % of Solution |
|---|---|
| starch | 1 to 7 |
| browning agent | 4 to 12 |
| water | 81 to 95 |

The coating includes a second lipid, which is preferably an oil. The oil listed in Table 1 could be any suitable oil such as soy, canola, sunflower, olive, or cottonseed. An example of a brand of oil that could be used is Lou Ana Cottonseed Oil (Code 54517) manufactured by Ventura Foods, LLC. The emulsifier could be lecithin (soy bean) or DATEM esters. If lecithin is used, preferably approximately 0.1% or less is used. An example of a brand of lecithin that could be used is Yelkin™ lecithin manufactured by Archer Daniels Midland Company (ADM). An example of a brand of DATEM esters that could be used is Panodan™ Visco-Lo 2000 DATEM esters manufactured by Danisco A/S.

The starch listed in Table 2 could be a waxy rice starch comprising approximately 1 to 7%, preferably approximately 4%, of the aqueous starch solution although other starches at various levels could be used. An example of a suitable waxy rice starch is PenPlus™ WR waxy rice starch manufactured by Penford Food Ingredients Co. An example of a browning agent, which is preferably liquid, is Maillose manufactured by Red Arrow Products Company LLC. In addition, the viscous aqueous solution could be devoid of starch and instead be based upon approximately 0.2 to 0.6%, preferably approximately 0.4%, of a gum, preferably guar gum, and more preferably as part of the product Icein™ food processing aid, the primary constituent of which is guar gum and also includes zein, manufactured by Global Protein Products, Inc., which assists in making the food product crispy.

Preferably, approximately 0.2 to 2.0% based on the weight of the food product of the coating is applied to the food product, and the coating is maintained at a temperature of approximately 45 to 75° F. (7 to 24° C.). The coating reduces burning of the food product surface during further processing. The coating has a relatively high moisture content of approximately 40 to 70% so that before unwanted product surface burning can occur the moisture is first evaporated. If an oil suspension is used as the coating, the moisture evaporates off of the food product and then the oil allows it to "fry". Preferably, the coating is unstable enough so that the coating oil can separate out and then the product surface can bubble during further processing as if deep fat fried. The coating assists in creating relatively small blisters approximately 0.05 to 10.0 millimeters, preferably approximately 0.1 to 3.0 millimeters, in diameter on the surface of the food product.

If a docking agent such as bread crumbs or corn grit is used, the docking agent is preferably used at a level of approximately 1 to 5%, more preferably approximately 3%, in the formulation of the edible dough-based cover layer. The docking agent preferably has a particle size of approximately 0.3 to 1.2 millimeters average diameter as an ingredient of the dough and is preferably first sprayed with approximately 15 to 30%, preferably approximately 20%, oil such as soy or cottonseed, before being mixed into the dough. In this way it first absorbs fat and oil to assist in forming smaller blisters in the edible cover layer during further processing. With the incorporation of the docking agent sprayed with oil, the fat ingredient added directly to the dough formula can be reduced from a range of preferably approximately 0.7 to 2.5%, more preferably approximately 2.0%, to a range of preferably approximately 0.1 to 0.6%, more preferably approximately 0.4%.

After coating, the food product is heated using an impingement oven, which includes highly turbulent airflow in the form of jets directed toward the surface of the food product. Examples of suitable impingement ovens are the Lincoln Impinger 1300 and the Lincoln Dual Technology Finisher manufactured by Lincoln, Super Jet manufactured by Fujimak, and PS536GS Gas Oven manufactured by Middleby-Marshall modified to include long, tubular nozzles to direct the air closer to the food product. Preferably, food product is heated in the impingement oven at a temperature of approximately 400 to 600° F., with an airflow velocity of approximately 5 to 40 meters per second, and for less than approximately 140 seconds, preferably approximately 100 to 140 seconds. Preferably, the internal temperature of the food product after heating in the impingement oven is approximately 170 to 212° F. (77 to 100° C.). Depending upon the type of food product, the food product's edible core should be heated to a temperature of at least approximately 165° F. for food safety.

When the product is baked in the impingement oven, inevitably some of the coating falls off and burns, creating environmentally undesirable fumes, some also burning and accumulating onto equipment surfaces that subsequently have to be cleaned. In this way, a solution with approximately 0.2 to 0.6%, preferably approximately 0.4% of a carbohydrate such as guar gum, as compared to approximately 4.0% of another carbohydrate such as starch, produces less burnt fumes and less burning onto equipment surfaces. One advantage of using guar gum, therefore, is that it produces less fumes and less burning onto equipment surfaces that later need cleaning. Additionally, it has been found that guar gum based aqueous solutions produce more fried-like product properties than waxy rice starch.

The impingement oven accelerates heat transfer onto the food product and accelerates evaporation of moisture from the surface of the food product. Preferably, the airflow is perpendicular to surface of the food product from both above and below the food product. The long, tubular nozzles enhance the effectiveness by producing a rifling effect. Thus, the integrity of the jets is better preserved because the airflow fans out less rapidly with longer nozzles than shorter nozzles. Also, the heat does not dissipate as quickly, and the long, tubular nozzles allow the air to escape around the nozzles after contacting the food product. The preferred ratio of nozzle length to nozzle diameter is approximately 5 or greater. The preferred ratio of nozzle diameter to distance between the nozzle outlet and the food product is approximately 3.0. In addition, the impingement oven could include infrared heat proximate the top and the bottom.

Preferably, before the food product is placed in the impingement oven, the flap is positioned up. After approximately 30 seconds, the food product is rotated approximately 180 degrees to position the flap down. After another approximately 30 seconds, the food product is rotated approximately 180 degrees to position the flap up. After another approximately 30 seconds, the food product is rotated approximately 180 degrees to position the flap down. The food product should be rotated at least once, preferably three to four times, and most preferably four times, starting before the food product is placed in the impingement oven or while the food product is being heated in the impingement oven. Alternatively, the food product could be substantially constantly rotated for approximately 120 seconds. If the flap were left down during the entire heating process, the portion of the food product proximate the flap would become too wet and soggy and the opposite side would develop undesirably large blisters and burn. Thus, rotating the food product assists in creating a more aesthetically pleasing product by reducing the size of the blisters, enhancing the fried appearance, preventing burning, and preventing a compressed and soggy surface.

Pre-heating the food product using microwave energy allows the high heat transfer to the food product's surface during the impingement oven heating step to be relatively short because the center does not have to be heated as much. The protective emulsion coating prevents burning and helps impart a fried quality because the aqueous layer burns off and then the oil layer "fries" proximate the outer surface of the food product.

In the present invention, because the food product is not fried in oil, the porous surfaces left by evaporation of moisture are not subsequently filled with frying oil. Some of the coating could be blown off, evaporated, or otherwise removed from the food product. The amount of coating on an approximately 85 gram egg roll is preferably approximately 0.5 to 2.0 grams, and of that, approximately 20 to 70% remains after the impingement oven heating. The heated food product comprises approximately 0.2 to 0.8 weight % of the first lipid and approximately 0.4 to 2.0 weight % of the second lipid. The total fat content of the edible cover layer and the coating layer is approximately 1 to 3 weight % based on the weight of the food product. Fat absorbed during the process is reduced by approximately 50 to 90% less compared to normal frying.

The heating process, including both microwave and impingement oven heating, preferably takes approximately 150 to 200 seconds. More preferably, the process takes approximately 180 seconds, which is approximately 80 seconds (30%) shorter than the typical frying process of approximately 260 seconds. Preferably, the microwave heating step takes approximately 40 to 60 seconds and the impingement oven heating step takes approximately 100 to 140 seconds.

For example, FIGS. 2A-2C and 3A-3C each describe three different approximately 3 ounce (85 gram) egg rolls prepared in three different processes but with the same filling. The processes are "Current Fried Product", "Dough+Dip Product", and "No Oil". Conventional frying at approximately 360° F. (182° C.) for approximately 260 seconds was used to prepare the Current Fried Products in FIGS. 2A-2C and 3A-3C. The cover layer dough was similar to currently available fried products with approximately 0.7% shortening in the dough formula. For the Dough+Dip Products and the No Oil in FIGS. 2A-2C and 3A-3C, the dough had approximately 2.0% shortening and the processing steps involved were similar in principle to those illustrated in FIG. 1. More specifically, the egg rolls were heated in a microwave oven at a frequency of approximately 2450 MHz, a power of approximately 40 Watts per ounce (28.3 grams), and an oven temperature of approximately 200° F. for approximately 60 seconds. The egg rolls were rolled in a viscous coating of a type described above with approximately one gram of coating per approximately 85 gram egg roll. The egg rolls were then heated in an impingement oven at approximately 450° F. (232° C.) for approximately 120 seconds. In the case of the Dough+Dip Products in FIGS. 2A-2C and 3A-3C, one and the same emulsified viscous coating was used, and it contained approximately 45% cottonseed oil, approximately 0.05% soy lecithin, and approximately 55% of an aqueous starch solution containing approximately 4.5% waxy rice starch, approximately 4.5% Maillose browning agent, and approximately 81% water. The viscous coating for the No Oil products in FIGS. 2A-2C and 3A-3C was similar in viscosity, but it contained no oil and no soy lecithin. For this reason, the total fat contents for these products was significantly lower than for the Dough+Dip Products because no surface oil was absorbed from the viscous coating during heat processing, specifically, during impingement heating.

Figure 4:
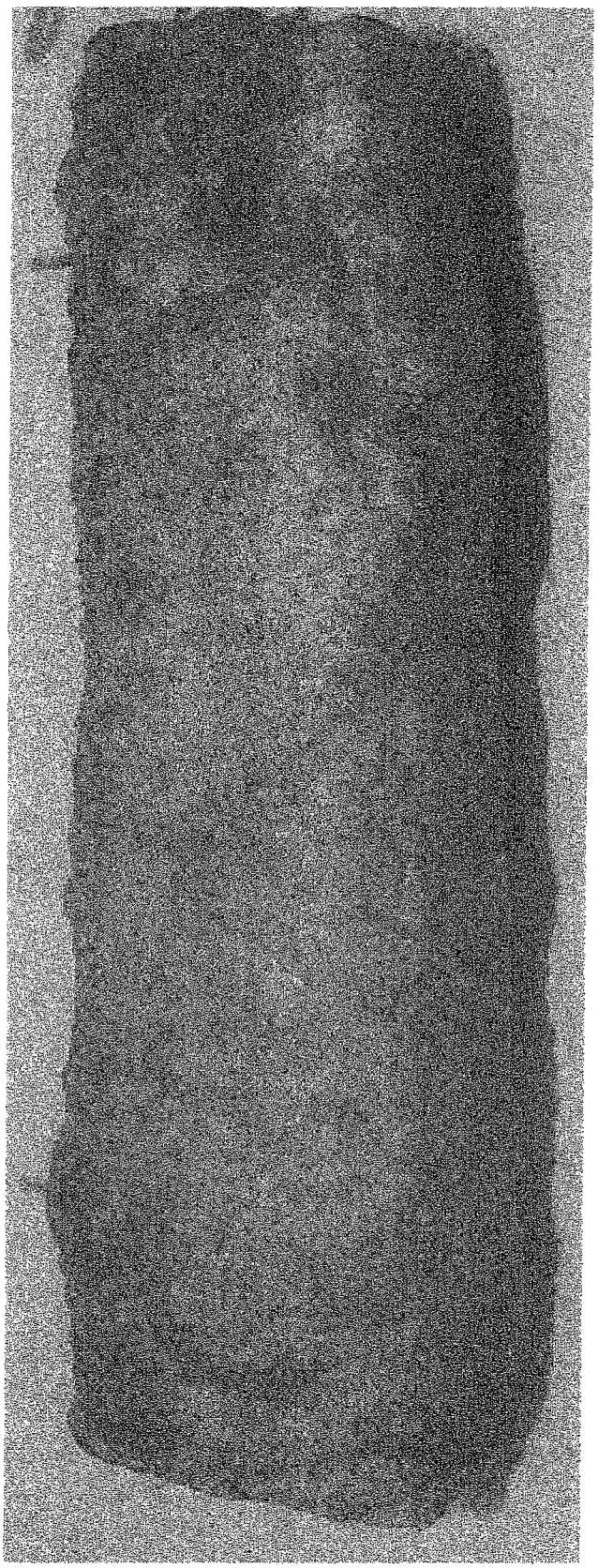
FIG. 4 is a photo of an egg roll heated using a method in accordance with the principles of the present invention.
Figure 5:
FIG. 5 is a photo of egg rolls heated using a method in accordance with the principles of the present invention.
Figure 6:
FIG. 6 is a photo of pot stickers heated using a method in accordance with the principles of the present invention.
Figure 7:
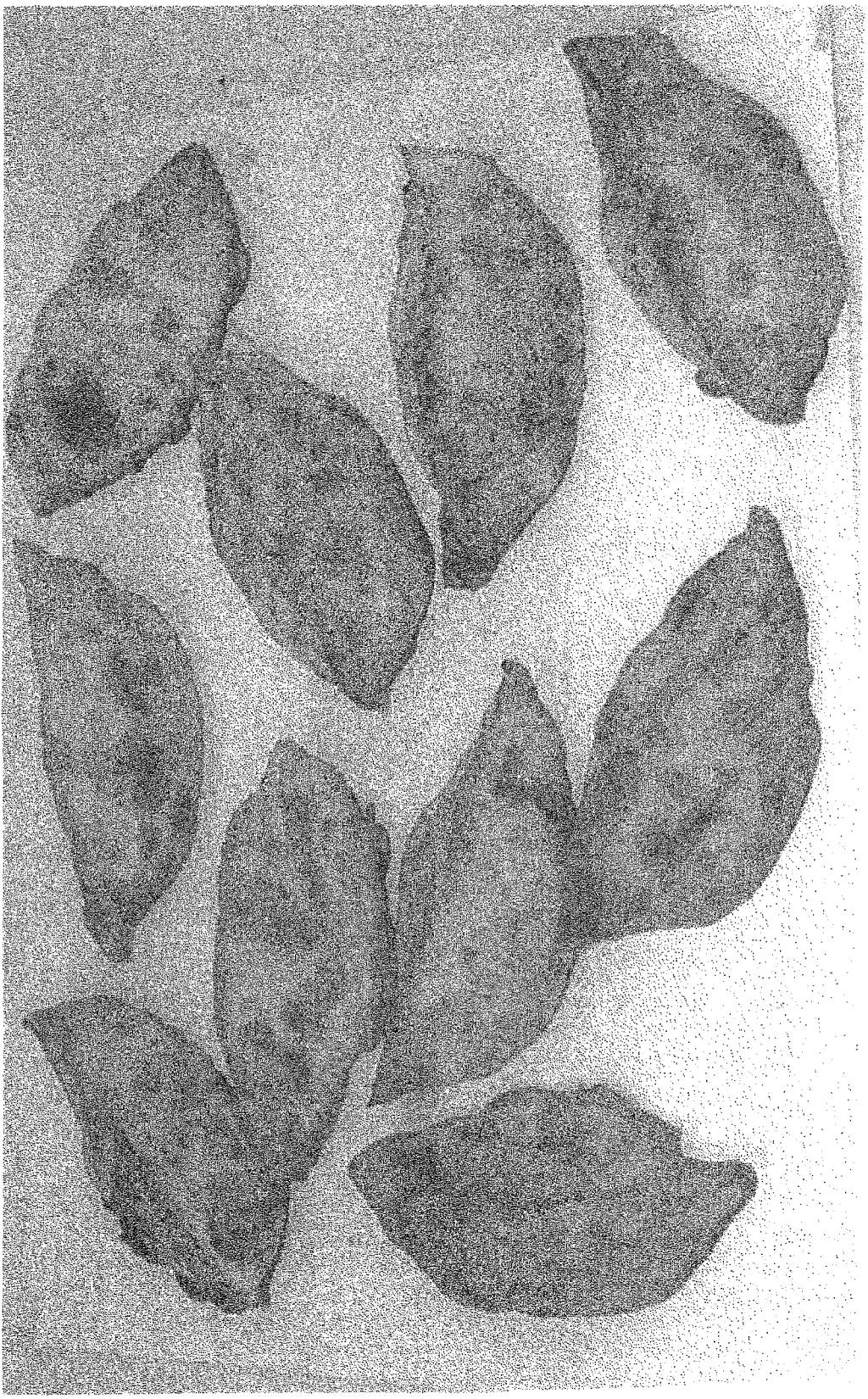
FIG. 7 is a photo of pot stickers heated using a method in accordance with the principles of the present invention.
Figure 8:
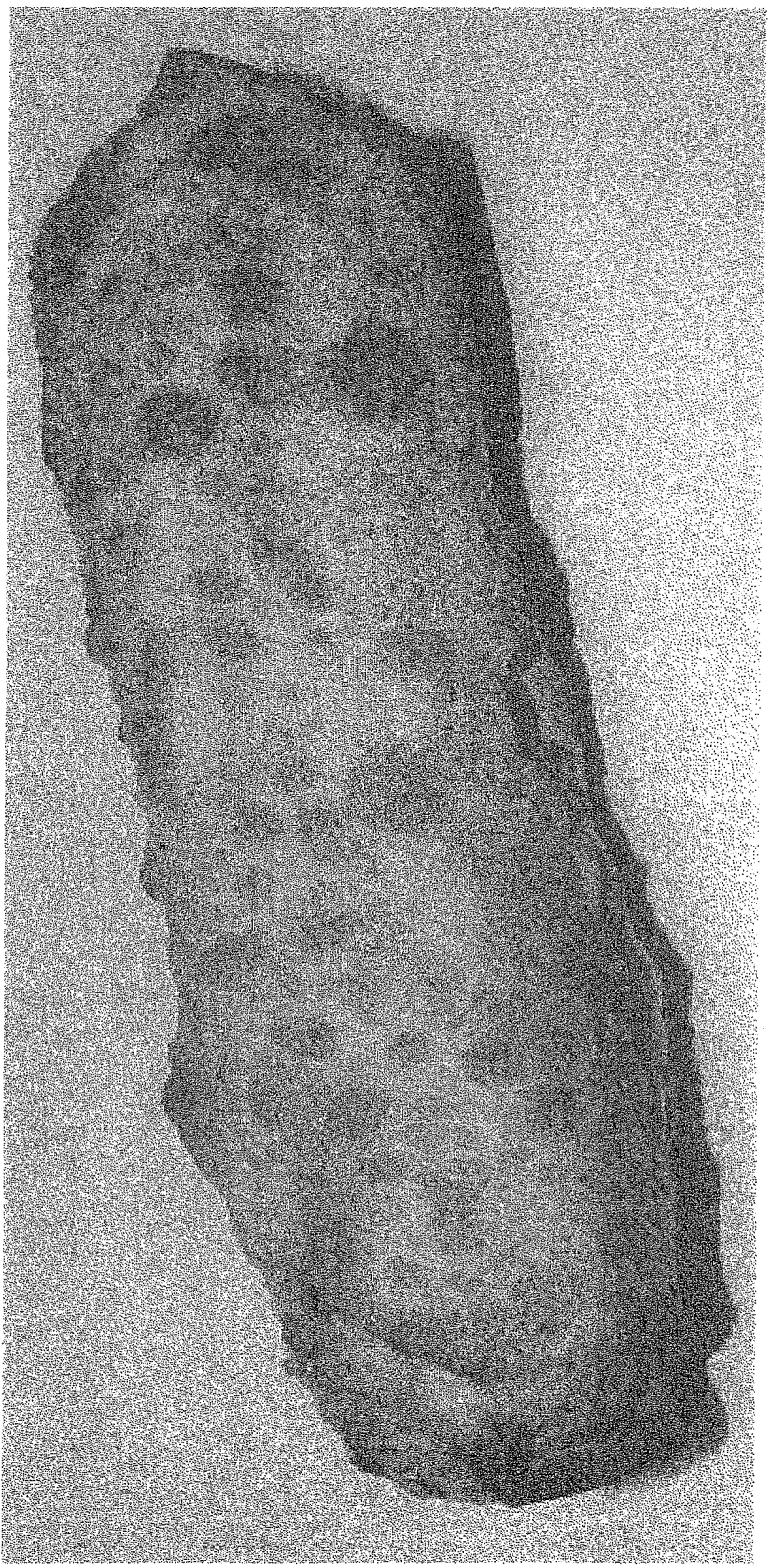
FIG. 8 is a photo of an egg roll heated using a method in accordance with the principles of the present invention.
Figure 9:
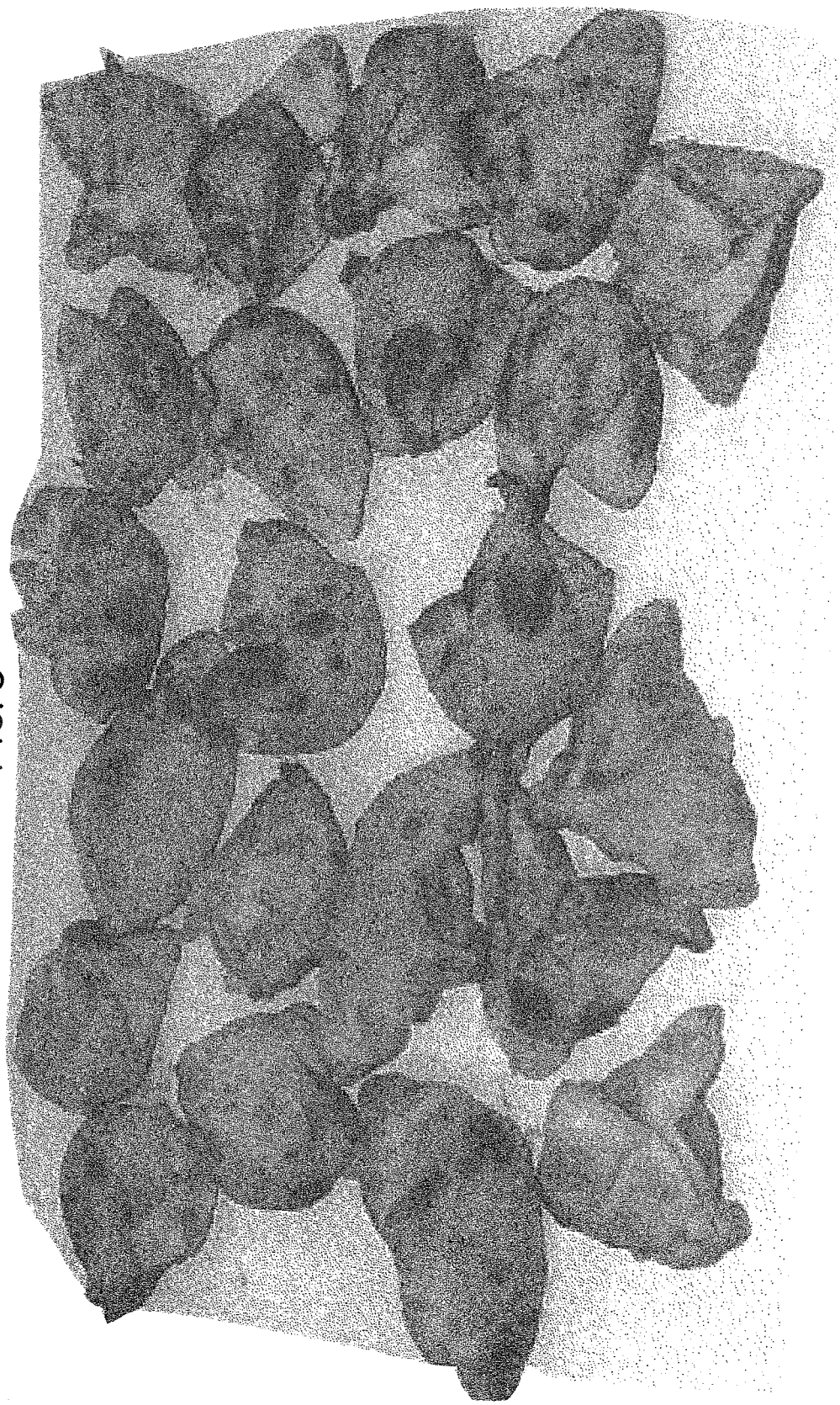
FIG. 9 is a photo of a crab Rangoon heated using a method in accordance with the principles of the present invention.

FIGS. 4 and 5 show egg rolls heated using this process, FIG. 6 shows pot stickers heated using this process, and FIGS. 7-9 show pot stickers, an egg roll, and a crab Rangoon, respectively, heated using this process. The coating used in FIGS. 7-9, unlike FIGS. 4-6, was not an oil-in-water emulsion but cottonseed oil only.

The egg roll shown in FIG. 4 was baked with an optimized emulsion coating of cottonseed oil in an aqueous gum paste, approximately 0.4% guar gum based Icein™ in water. The egg rolls shown in FIG. 5 were baked with an optimized emulsion coating of cottonseed oil in an aqueous starch paste, approximately 4% waxy rice starch in water. The pot stickers shown in FIG. 6 were baked with an optimized emulsion coating of cottonseed oil in an aqueous starch past, approximately 4% waxy rice starch in water. The pot stickers shown in FIG. 7 were baked with a coating of cottonseed oil only. The egg roll shown in FIG. 8 was baked with a coating of cottonseed only. The crab Rangoon shown in FIG. 9 was baked with a coating of cottonseed oil only.

Figure 10:
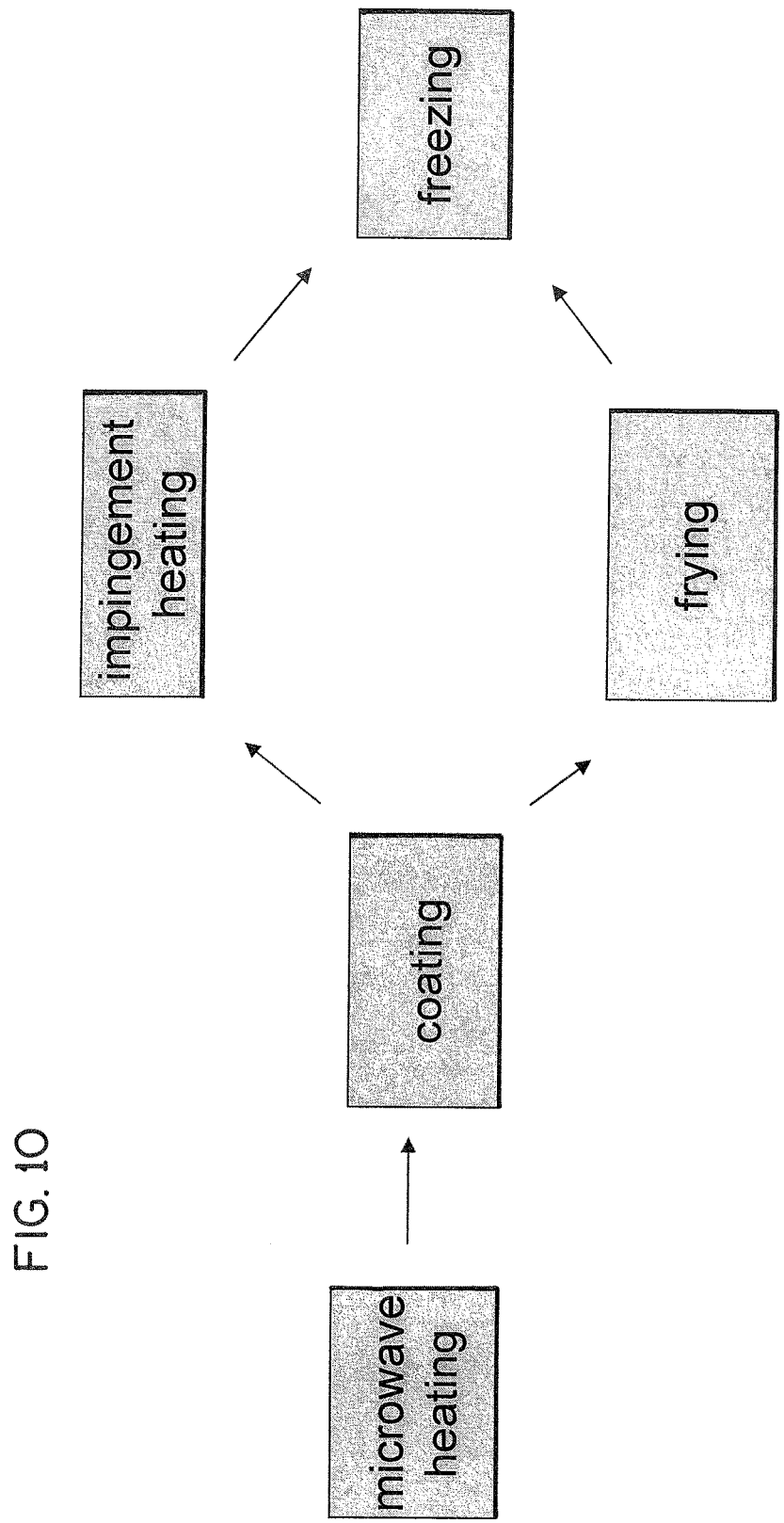
FIG. 10 is a schematic view illustrating another preferred embodiment method of making a cooked food having a fried appearance in accordance with the principles of the present invention.

In another embodiment method of making a cooked food having a fried appearance in accordance with the principles of the present invention, the food product could be moved along a conveyor assembly to either an impingement oven or a fryer after being coated. If the food product is fried, the food product could be fried with less oil because the fry time is shortened by microwave pre-heating. Then, after either heating in the impingement oven or in the fryer, the food product could be moved to a freezer. This is shown in FIG. 10. This versatile system could be used for many types of products.

Alternatively, in another preferred embodiment method of making a cooked food having a fried appearance in accordance with the principles of the present invention, the microwave energy and the impingement oven could be combined into one step. The microwave energy preferably has a frequency of approximately 800 to 3000 MHz and approximately 20 to 50 Watts of power per ounce of product, and the impingement oven has an air temperature of approximately 400 to 600° F. and an air velocity of approximately 5 to 40 meters per second. This synergistic combination provides a reduced total process time of approximately 80 to 120 seconds. Further, the edible cover layer appears browner and crispier. It is believed the combination of physical and chemical attributes of the cover layer and air temperature created a higher dielectric loss factor at the surface of the product relative to the center so the microwave energy increased heating of the outer surface compared to the center. Effectively, the edible cover layer under these conditions becomes an edible susceptor.

It is recognized that changes could be made to any of the methods such as microwave power intensity, impingement velocity, impingement oven temperature, and so forth. Even during the process, the microwave power could be increased or decreased, or even turned on or off, the impingement velocity could be changed by controlling plenum pressure or fan speed. Also, the coating formulation could be changed for different food products.

Generally with regard to the present invention, the process time is reduced, which reduces the amount of moisture evaporated from the product. Thus, the lower weight of fat compared to normally fried products, which pick-up fat during frying, is substituted with a higher weight of moisture remaining from raw materials. The product does not require additional raw materials to replace the lost weight of the product from reduced fat pick-up during frying. Higher moisture also creates fillings (edible cores) that may be more tender, fresher looking and tasting, and more nutritious. Examples include fillings containing fresh fruits such as strawberries or fresh vegetables such as red cabbage, where their bright color, texture, flavor, and nutritional contents are better preserved. Overall, the products are generally less greasy and perceived freshness of the filling is better preserved than conventionally deep fat fried products. The reduced process time also increases the production rate.

Although this invention is preferably for use in industrial applications, this invention could also be used in food service kitchens and residential kitchens. The industrially manufactured products could be chilled or frozen and sold to foodservice customers or individuals at retail outlets.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of making a cooked food product having a fried appearance, comprising:
   assembling a food product having a weight of approximately 1 to 4 ounces (28.3 to 113.4 grams), the food product comprising an edible core and an edible cover layer substantially enveloping the edible core, the edible cover layer comprising a farinaceous composition comprising approximately 20 to 50 weight % of the food product and a first lipid comprising approximately 0.7 to 2.5 weight % of the edible cover layer, wherein the edible cover layer is a dough;
   initial heating of the food product with microwave energy to an internal temperature of the food product of approximately 120 to 180° F. (49 to 82° C.);
   coating the food product with a coating layer comprising a second lipid to form a coated food product, the coating layer contacting the edible cover layer after the food product is assembled and initially heated but before subsequent heating of the food product; and
   subsequent heating of the coated food product in an impingement oven at a temperature of approximately 400 to 600° F. (200 to 325° C.) for less than approximately 140 seconds to form the cooked food product with a fried appearance, wherein the fried appearance is characterized by an at least partially browned exterior having small blisters arising from heating the coated food product, the coating layer preventing burning and imparting the fried appearance because the second lipid fries proximate an outer surface of the edible cover layer during the subsequent heating in the impingement oven, the edible cover layer and the coating layer having a total fat content of approximately 1 to 3 weight % of the food product.

2. The method of claim 1, wherein the first lipid is a shortening.

3. The method of claim 1, wherein the coating layer applied to the food product comprises approximately 0.2 to 2.0 weight % of the food product.

4. A method of obtaining a cooked food product with a fried appearance characterized by an at least partially browned exterior having small blisters arising from heating, comprising:
   assembling a food product with an edible core and an edible cover layer, the edible cover layer comprising approximately 0.7 to 2.5 weight % of a first lipid based on the weight of the edible cover layer, the food product weighing approximately 1 to 4 ounces (28.3 to 113.4 grams), wherein the edible cover layer is a dough;
   initial heating of the food product with microwave energy at a frequency of approximately 800 to 3000 MHz, at a power of approximately 0 to 50 Watts per ounce (28.3 grams) of food product, and for approximately 0 to 80 seconds;
   coating the food product with a coating layer comprising a second lipid, such that the coating layer applied to the food product comprises approximately 0.2 to 2.0 weight % of the food product, to form a coated food product the coating layer contacting the edible cover layer after the food product is assembled and initially heated but before subsequent heating of the food product; and then
   subsequent heating of the coated food product in an impingement oven at a temperature of approximately 400 to 600° F. (200 to 325° C.) for less than approximately 140 seconds to form the cooked food product with a fried appearance, the edible cover layer and the coating layer having a total fat content of approximately 1 to 3 weight % of the food product.

5. The method of claim 4, wherein the cooked food product comprises approximately 0.2 to 0.8 weight % of the first lipid and approximately 0.4 to 2.0 weight % of the second lipid.

6. The method of claim 4, wherein the coating layer comprises an aqueous oil emulsion comprising approximately 40 to 100 weight % of an aqueous phase and approximately 0 to 60 weight % of an oil phase.

7. The method of claim 4, wherein the impingement oven comprises an air velocity of approximately 5 to 40 meters per second.

8. The method of claim 4, wherein the coated food product is heated in the impingement oven at a temperature of approximately 400 to 600° F. (200 to 325° C.) for approximately 100 to 140 seconds.

9. The method of claim 4, wherein the food product is an egg roll.

10. The method of claim 4, wherein the food product is transported through the heating and coating steps on a mesh conveyor.

11. The method of claim 4, wherein the coating layer is an aqueous oil emulsion maintained at a temperature of approximately 45 to 75° F. (7 to 24° C.).

12. The method of claim 4, wherein the internal temperature of the food product after the microwave step is approximately 120 to 180° F. (49 to 82° C.).

13. The method of claim 4, wherein the internal temperature of the food product after the impingement step is approximately 170 to 212° F. (77 to 100° C.).

14. The method of claim 1, wherein the first lipid is selected from the group consisting of a room temperature solid fat and a room temperature semi-solid fat.

15. The method of claim 1, wherein the first lipid comprises approximately 0.7 to 2.5% shortening.

16. The method of claim 1, wherein the edible cover layer includes a docking agent.

17. The method of claim 16, wherein the docking agent is selected from the group consisting of bread crumbs and corn grit.

18. The method of claim 16, wherein the docking agent has an average particle size diameter of approximately 0.3 to 1.2 millimeters.

19. The method of claim 16, wherein the docking agent is sprayed with approximately 15 to 30% oil.

20. The method of claim 19, wherein the docking agent reduces the weight % of the first lipid to approximately 0.1 to 0.6 weight % based on the weight of the edible cover layer.

21. The method of claim 1, wherein the second lipid comprises an oil.

22. The method of claim 1, wherein the second lipid is an oil selected from the group consisting of soy, canola, sunflower, olive, and cottonseed.

23. The method of claim 1, wherein the edible core is selected from the group consisting of a savory core, a sweet core, and a combined savory and sweet core.

24. The method of claim 1, wherein the food product is selected from the group consisting of egg rolls, burritos, chimichangas, flautas, potstickers, and puffs.

25. The method of claim 1, wherein the edible core has approximately 0% fat content.

26. The method of claim 1, wherein the first lipid and the second lipid are the same.

27. The method of claim 1, wherein the edible cover layer is docked using a mechanical device.

28. The method of claim 16, wherein a combination of the coating layer and the docking agent reduces the small blisters to a size of 0.05 to 10.0 millimeters in diameter proximate the outer surface of the edible cover layer.

29. The method of claim 16, wherein a combination of the coating layer and the docking agent reduces the small blisters to a size of 0.1 to 3.0 millimeters in diameter proximate the outer surface of the edible cover layer.

30. The method of claim 4, wherein the edible cover layer includes a docking agent.

31. The method of claim 30, wherein a combination of the coating layer and the docking agent reduces the small blisters to a size of 0.05 to 10.0 millimeters in diameter proximate the outer surface of the edible cover layer.

32. The method of claim 30, wherein a combination of the coating layer and the docking agent reduces the small blisters to a size of 0.1 to 3.0 millimeters in diameter proximate the outer surface of the edible cover layer.

33. The method of claim 1, wherein the impingement oven comprises an air velocity of approximately 5 to 40 meters per second.

* * * * *